INVENTOR.
JEAN SALLOU
BY
ATTORNEY

Patented Mar. 20, 1951

2,545,861

UNITED STATES PATENT OFFICE 2,545,861

DEVICE UTILIZING THE THERMAL-PUMP PRINCIPLE FOR THE PRODUCTION OF HEAT AND COLD

Jean Sallou, Paris, France, assignor to Societe Anonyme des Etablissements Neu, Lille, France, a French corporation Application July 17, 1947, Serial No. 761,562
In France March 16, 1946

Section 1, Public Law 690, August 8, 1946
Patent expires March 16, 1966

6 Claims. (Cl. 62—136)

The invention relates to processes and devices applying the thermal-pump principle to the production of heat and cold.

Processes and means for heating and cooling are known which are based on the principle of the thermal-pump, and which comprise one or more fluid or air-compressors, one or more thermal devices, and one or more machines for the expansion of the air or other fluid.

In these expansion machines, there is recovered a portion of the energy required for compressing the air or other fluid, for maintaining the movements of the air or fluids, and for operating the auxiliary appliances, and losses of all kinds are also recovered.

The requisite supplemental energy is supplied by a compressor unit of the reciprocating piston type, controlled by a connecting rod and crankshaft system, or by a volumetric or centrifugal rotary blower type of machine coupled with a prime mover.

My present invention essentially consists in combining, in order to provide said supplemental energy supply, a heat engine operated by floating or freely movable pistons, with a heating and cooling plant based on the principle of the thermal pump, said heat engine comprising a pair of opposite pistons, interconnected by a synchronizing and reciprocated in an engine cylinder. One of the pistons is connected by a rod with the piston of a compressor and the other piston is connected with the piston of a restoring or recuperating device adapted to restore the movable members to the end-of-compression position in the heat engine.

My invention contemplates an arrangement combining the floating piston operated heat engine and the related air or fluid-compressor, with an air or fluid-expansion machine, the latter being of the reciprocating type. All three machines, namely the heat-engine, the compressor and the expansion machine form a coaxial unit, the engine piston being connected with the compressor piston and the expansion machine piston through the medium of rods. The assembly comprising all three pistons thus forms a unitary body movable as a whole.

The fluid or air compressed in the compressor, is thereafter treated and cooled, and then is expanded in the expansion machine, in which it does work. If desired, and according to requirements of use, I may cause the heat engine compressor to supply only a portion of the total amount of air or fluid flowing through the compressor coupled with the expansion machine.

The production of supplemental energy necessary to operate a system based on the heat pump principle from a floating piston heat-engine, involves the use of a compact, light-weight, highly efficient and structurally simple unit or units. Moreover, when the fluid used is air it may be used either directly or after treatment in the plant.

If necessary, the action of the unit or units mentioned may be combined with that of other devices. It is also within the scope of the invention to use a blower to supply the compressor or compressors with a booster pressure, and further to use an air-blower to supercharge the heat-engine. If the fluid used is air, the same blower may serve to supply both the compressor or compressors and the heat-engine.

In certain cases the air as compressed by the compressor or compressors may be used directly to supercharge the heat-engine.

In accordance with another aspect of the invention, I effect the expansion of the air or fluid in two stages. In the first stage, expansion from the maximum to the medium pressure is effected in a reciprocating expansion machine, and in the second stage, expansion from said medium pressure down to the pressure level at which said fluid is used, is accomplished in a rotary type expansion machine. In some instances I may use a turbine to recover the remaining energy at the exhaust end of the heat-engine.

According to the intended use of the plant, the air or fluid-expansion turbine is coupled with the booster-pressure blower and as the case may be, with the exhaust turbine of the heat-engine so as to form a single integral unit. In that case the fluid is compressed in two stages, first in the blower, then in the compressor of the floating-piston machine. If the fluid is air, an air take-off may be provided to tap a portion of the air to supercharge the heat-engine.

In order to reduce the passive resistances opposing the movement of the movable bodies formed by the intercoupled pistons suitable means are used, and in one specific embodiment of my invention, I use a device adapted to impart to these movable bodies a continuous or discontinuous rotating or lobbing motion during their reciprocation.

In all cases, the apparatus may be dissymmetrical or symmetrical with the scope of the invention. Furthermore, any one of the portions of the apparatus may be combined to obtain additional effects, or the apparatus may be combined with other apparatus such as apparatus of the class comprising heat exchangers, refrigerators and the like, it being possible to interpose said devices in the path of the air or other fluid between any of a number of units.

The process according to my invention may be applied to all kinds of heating or cooling plant installations, which may be independent or associated with one another. Examples of such installations are air-conditioning plants, cooling plants, air-drying plants and so on, whether said plants are on land or installed on board ship, on vehicles, or on aircraft, and the like.

My method is particularly suitable in connection with air-conditioning plants where the air is to be dried. In that case, water will be extracted at various points in the circuit traversed by the air, at each compression or expansion stage, or in suitable thermal apparatus. The ratio between the pressure values in the expansion stages will be so selected as to avoid the production of ice.

In the appended drawing, I have illustrated some illustrative embodiments of apparatus according to my invention:

Figure 1:
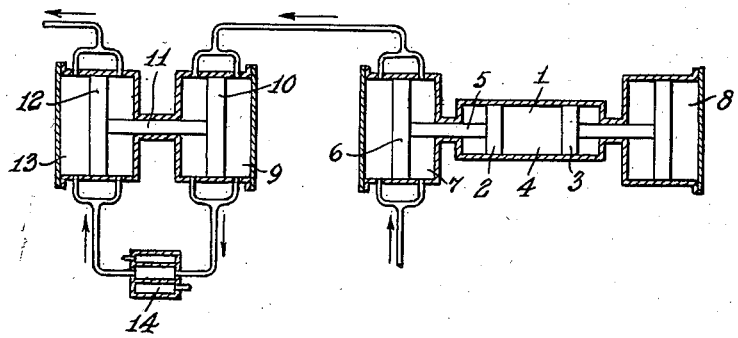
Fig. 1 shows an embodiment of a heat-engine operated by floating pistons linked with an air compressor and combined with a compression-expansion unit.

Referring to the embodiments illustrated in the drawing, Fig. 1 shows a heat engine 1 operated by floating pistons and having two oppositely disposed pistons 2 and 3 reciprocating in the cylinder 4. The piston 2 actuates, through a rod 5, the piston 6 of the compressor 7. The piston 3 is connected with the restoring or recuperating device 8 the function of which is to restore the movable elements back to their end-of-compression position in the cylinder 4.

Fig. 1 also shows a reciprocating compression-expansion unit comprising a compressor 9, the piston 10 of which is connected through a rod 11 with the piston 12 of an expansion machine 13. Alternatively, I may use a compression-expansion unit operated by membrane type pistons, or a rotary unit.

The fluid employed, such as air, is first compressed in the compressor 7, then in the compressor 9. It is then treated and cooled in the apparatus 14. Then the air is caused to expand in the expansion machine 13. After this expansion step, the air or fluid is used either directly or after a preliminary treatment. Whether the fluid be air or another fluid, it may flow through the compression-expansion unit and the auxiliary heat devices in a closed circuit. In this case, the compressor, actuated directly by the heat engine, discharges a flow of air or fluid after treatment into the discharge conduit of the compressor of the compression-expansion unit, said flow of fluid being added to the flow of fluid circulating in a closed circuit.

Figure 2:
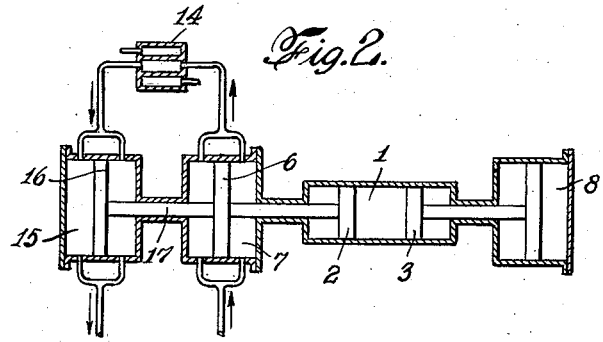
Fig. 2 shows an embodiment of a unitary reciprocating apparatus comprising a heat-engine, a compressor and an expansion machine.

In the example shown, Fig. 2 illustrates a heat engine and a compressor 7 comprising the same essential elements as the above-described engine and compressor. In this example, the reciprocating expansion machine 15 comprises a piston 16 connected by a rod 17 to the piston 6 of the compressor 7. All three reciprocating machines 1, 7 and 15 are coaxially disposed and form an integral unit. The three pistons 2, 6 and 16 form an integral movable body to which a reciprocating movement is imparted. The fluid used, e. g. air, is compressed in the compressor 7, then is treated and cooled by the apparatus 14, and is then caused to expand in the expansion machine 15. It is then used directly or after treatment. I may use the air-expansion machine for the return to dead center corresponding to the end of compression position in the engine cylinder 4. In that case, the restoring device 8 may be omitted.

Figure 3:
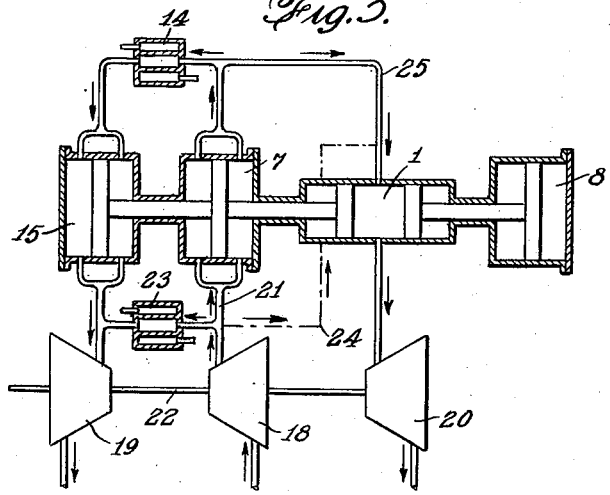
Fig. 3 shows an embodiment of a unitary reciprocating apparatus similar to that of Fig. 2 with which is associated a unitary rotary apparatus including a turbine operated by the heat-engine exhaust-gases, a booster-pressure blower to supercharge the heat engine and the reciprocating air-compressor, and an air-expansion turbine.

Fig. 3 shows a combination of the above-described reciprocating integral unit shown in Fig. 2 with rotary type machines. Similarly I contemplate the combination of two units as described above in connection with Fig. 1, with rotary machines.

Referring to the embodiment illustrated in Fig. 3, there is shown an integral unit including a heat engine 1, a compressor 7 and an expansion machine 15 as in the previously-described embodiment. Moreover, there is used a group of rotary machines formed by a blower 18, an expansion machine 19 and a turbine 20, utilizing the remaining energy in the exhaust of the heat engine 1. The three units are coaxial and have their rotors coupled together.

Assuming the fluid employed is air, the blower 18 aspirates air which generally is taken in at atmospheric pressure. All or part of this compressed air flows through the conduit 21 to the intake of the compressor 7 and is discharged therefrom at a higher pressure. It is treated and cooled in the apparatus 14, then is caused to expand in the reciprocating expansion machine 15, then in the rotary expansion machine 19. It is contemplated, according to the conditions of use, that the air compressed in the blower 18 may be conveyed totally or in part through an apparatus 23 in which it is cooled, into the expansion machine 19.

It is also contemplated, depending on conditions of use, that the air serving to supercharge the heat-engine may be tapped either from the discharge of the blower 18 through the conduit 24, or at the discharge of the compressor 7 through the conduit 25.

After expansion, the air may be used directly or after treatment. In some cases, the air is distributed under pressure and this pressure is used in auxiliary machines, for instance, in the case of the air in air-fans.

If the treated air is damp and warm, it will be desiccated as it passes through the various devices. I may provide for the extraction of water at various points, such as in the cooling devices or at each stage of compression or expansion.

The subdivision of the expansion into successive stages has the advantage of adverting the formation of frost or snow in the machines and increasing the efficiency. Those stages having a high pressure differential and a low rate of flow are effected by the reciprocating machines, while those stages having a small pressure difference and a high rate of flow are effected by the rotary machines. The same applies to the subdividing of the compression phase.

The appended drawings do not illustrate all of the supplementary apparatus used. For example, exchangers, reheaters, refrigerators are used, and may be mounted in series or in parallel with any one of the devices shown to produce new and further effects to modify the effects obtained and to increase the efficiency rates. I may likewise modify the path of the circuit connections, the arrangement of the apparatus units, their number, the circulation of the fluid or air, and so forth.

The foregoing description, given merely by way of example, is in no way intended to be restrictive of the invention. Industrial embodiments in adaptation of the process, and the utilization of the device, may lead to the provision of constructional arrangements which may differ from the above-disclosed ones without departing from the scope of my invention as defined in the appended claims.

I claim:

1. A thermodynamic fluid medium translating unit, comprising a combustion motor having two free pistons, one of said pistons being rigidly joined to the piston of a compressor and the other to the piston of a restorer, a second compression stage, means comprising a fluid connection from said compressor to said second stage, said stage including a piston, an expander having a piston rigidly joined to said last-named piston, and a fluid exchanger forming a fluid connection from said second compressor stage to said expander.

2. A thermodynamic fluid medium translating unit, comprising a combustion motor having two free pistons, one of said pistons being rigidly joined to the piston of a compressor and the other to the piston of a restorer, an expander having a piston rigidly joined to said compressor piston, and a fluid heat exchanger forming a fluid connection from said compressor to said expander.

3. A thermodynamic unit according to claim 2, further including a turbine connected for actuation to the exhaust of said combustion motor, a fluid blower for supplying said compressor, a rotary expander in the exhaust of said first named expander to be actuated thereby, and means for furnishing compressed air to said combustion motor.

4. A thermodynamic unit according to claim 3, wherein said compressed air furnishing means comprises a connection from said first compressor to said combustion motor.

5. A thermodynamic unit according to claim 3, wherein said compressed air furnishing means comprises a connection from said blower to said combustion motor.

6. A thermodynamic fluid medium translating unit, comprising a combustion motor having two free pistons, one of said pistons being rigidly joined to the piston of a compressor and the other to the piston of a restorer, an expander, means for conducting the exhaust from said compressor to the intake of said expander, said means including a heat exchanger for removing heat from said exhaust.

JEAN SALLOU.

REFERENCES CITED

The following references are of record in the file of this patent:

UNITED STATES PATENTS

| Number | Name | Date |
| --- | --- | --- |
| 1,089,892 | Zoelly | Mar. 10, 1914 |
| 1,132,381 | Porter | Mar. 16, 1915 |
| 1,653,719 | Mauss | Dec. 27, 1927 |
| 1,726,491 | Johnson | Aug. 27, 1929 |
| 1,741,731 | Nordensson | Dec. 31, 1929 |
| 1,785,643 | Noack et al. | Dec. 16, 1930 |
| 2,075,133 | Pescara | Mar. 30, 1937 |
| 2,097,723 | Ewing | Nov. 2, 1937 |
| 2,115,921 | Steiner | May 3, 1938 |
| 2,306,978 | Pescara | Dec. 29, 1942 |
| 2,355,924 | Pescara | Aug. 15, 1944 |
| 2,429,948 | Steiner | Oct. 28, 1947 |